US009456343B1

(12) United States Patent
Mihalache et al.

(10) Patent No.: US 9,456,343 B1
(45) Date of Patent: Sep. 27, 2016

(54) ASSESSING MOBILE USER AUTHENTICITY BASED ON COMMUNICATION ACTIVITY

(71) Applicant: EMC Corporation, Hopkinton, MA (US)

(72) Inventors: Theodor Mihalache, Tel Aviv (IL); Maya Herskovic, Tel Aviv (IL); Ika Bar-Menachem, Herzelia (IL)

(73) Assignee: EMC Corporation, Hopkinton, MA (US)

( * ) Notice: Subject to any disclaimer, the term of this patent is extended or adjusted under 35 U.S.C. 154(b) by 12 days.

(21) Appl. No.: 14/132,750

(22) Filed: Dec. 18, 2013

(51) Int. Cl.
*H04M 1/66* (2006.01)
*H04M 1/68* (2006.01)
*H04M 3/16* (2006.01)
*H04W 12/06* (2009.01)

(52) U.S. Cl.
CPC ..................................... *H04W 12/06* (2013.01)

(58) Field of Classification Search
CPC ........... H04M 2215/32; H04M 15/00; H04M 2215/2026; H04M 17/00; H04W 4/24
USPC .................................................. 455/405, 410
See application file for complete search history.

(56) References Cited

U.S. PATENT DOCUMENTS

| 5,907,602 | A * | 5/1999 | Peel et al. ................ 379/114.14 |
| 6,334,121 | B1 * | 12/2001 | Primeaux .............. G06F 21/552 706/52 |
| 8,145,561 | B1 * | 3/2012 | Zhu ................................. 705/38 |
| 8,176,159 | B2 * | 5/2012 | Kashi .................... H04L 9/3226 709/203 |
| 8,326,794 | B1 | 12/2012 | Wood et al. |
| 8,532,610 | B2 * | 9/2013 | Manning Cassett .. H04L 43/026 455/405 |
| 8,566,595 | B1 | 10/2013 | Joyce et al. |
| 8,588,764 | B1 * | 11/2013 | Koller ..................... H04W 8/18 455/405 |
| 8,631,486 | B1 | 1/2014 | Friedman et al. |
| 8,635,447 | B1 | 1/2014 | Joyce et al. |
| 8,683,568 | B1 | 3/2014 | Khitrenovich et al. |
| 8,756,684 | B2 | 6/2014 | Frantz et al. |
| 8,781,975 | B2 | 7/2014 | Bennett et al. |
| 8,863,243 | B1 * | 10/2014 | Lidzborski ........................ 726/4 |
| 8,938,805 | B1 | 1/2015 | Juels et al. |
| 8,989,701 | B2 * | 3/2015 | Gauthier ............... H04W 12/02 455/406 |
| 2005/0278550 | A1 * | 12/2005 | Mahone et al. ............. 713/189 |
| 2014/0075464 | A1 * | 3/2014 | McCrea ........................... 725/14 |
| 2014/0379911 | A1 * | 12/2014 | Fayssal et al. ................ 709/225 |

* cited by examiner

*Primary Examiner* — Allahyar Kasraian
*Assistant Examiner* — B. M. M Hannan
(74) *Attorney, Agent, or Firm* — BainwoodHuang

(57) ABSTRACT

A technique performs user authentication. The technique involves generating a first usage pattern from a first set of mobile device communications performed during a first period of time. The technique further involves generating a second usage pattern from a second set of mobile device communications performed during a second period of time. The technique further involves performing a comparison between the first and second usage patterns to determine whether a human provider of the first usage pattern and a human provider of the second usage pattern are the same person. Accordingly, a malicious person who steals a mobile device or operates a mock mobile device would nevertheless be identified as different from the legitimate user because the malicious person does not behave the same way as the legitimate user (e.g., does not have the same phone call behavior, does not have the same text messaging behavior, etc.).

18 Claims, 5 Drawing Sheets

ASSESSING MOBILE USER AUTHENTICITY BASED ON COMMUNICATION ACTIVITY

BACKGROUND

Owners of smart phones can use their smart phones to access a variety of sensitive resources. Examples of such sensitive resources include the smart phones themselves, locally stored data, user accounts, virtual private networks (VPNs), online databases, remote content servers, and online games, to name a few.

Typically, to access a sensitive resource, the smart phone owner enters a personal identification number (PIN) or passcode into the smart phone. The entered PIN is then compared with an expected PIN to determine whether the owner is authentic. If the entered PIN is the same as the expected PIN, the smart phone owner is granted access to the sensitive resource.

SUMMARY

Unfortunately, there are deficiencies to the above-described conventional approach to controlling access to a sensitive resource. For example, a malicious person can steal the smart phone from the owner and, if the malicious person knows the owner's PIN, access the sensitive resource using the stolen smart phone. Additionally, a malicious person can configure another device to impersonate the owner's smart phone (e.g., copy the device name, use the owner's username and PIN, duplicate device cookies, etc.) and access the sensitive resource using the mock smart phone.

In contrast to the above-described conventional approach to controlling access to a sensitive resource, improved techniques are directed to assessing mobile user authenticity based on communication activity. In particular, a current usage pattern (e.g., communications activity during a current day) can be compared with a prior usage pattern (e.g., communications activity during a previous day) to determine whether a human provider of the current usage pattern and a human provider of the prior usage pattern are the same person. Such communications activity may include phone calls, mobile texting, and the like. Accordingly, if a malicious person steals the user's smart phone or creates an impersonating smart phone for malicious purposes, the malicious person would fail the assessment by not providing a usage pattern which is comparable to that of the authentic user. Along these lines, since it is unlikely that the malicious person would provide the same phone call behavior or the same text messaging behavior (e.g., the malicious person would not call into the office or text family), the malicious person will be identified as unauthentic and denied access. Such assessment can be performed continuously in the background as a transparent operation to the user.

One embodiment is directed to a method of performing user authentication. The method includes generating, by processing circuitry, a first usage pattern from a first set of mobile device communications performed during a first period of time. The method further includes generating, by the processing circuitry, a second usage pattern from a second set of mobile device communications performed during a second period of time. The method further includes performing, by the processing circuitry, a comparison between the first usage pattern and the second usage pattern to determine whether a human provider of the first usage pattern and a human provider of the second usage pattern are the same person. Accordingly, a malicious person who steals a mobile device or operates a mock mobile device would nevertheless be identified as different from the authentic user because the malicious person does not behave the same way as the authentic user (e.g., does not make the same type of phone calls, does not send the same type of text messages, etc.).

In some arrangements, the first usage pattern identifies prior mobile device communication activity during a prior time period, and the second usage pattern identifies current mobile device communication activity during a current time period. In these arrangements, performing the comparison between the first and second usage patterns includes providing an authentication result indicating whether the current mobile device communication activity during the current time period matches the prior mobile device communication activity during the prior time period.

In some arrangements, providing the authentication result includes deriving a numerical score based on the comparison between the first and second usage patterns. The numerical score indicates how closely the current mobile device communication activity during the current time period matches the prior mobile device communication activity during the prior time period.

In some arrangements, providing the authentication result further includes outputting, as the authentication result, (i) a successful authentication value indicating successful user authentication when the numerical score is below a predefined threshold and (ii) an unsuccessful authentication value indicating unsuccessful user authentication when the numerical score is above the predefined threshold.

In some arrangements, generating the first usage pattern includes collecting mobile device communications data during the prior time period, and generating the second usage pattern includes collecting mobile device communications data during the current time period. In these arrangements, the prior time period and the current time period can cover a same length of time (e.g., a 15 minute interval, an hour, a four hour time window, a half day, a day, a week, etc.).

In some arrangements, collecting the mobile device communications data during the prior time period includes gathering the mobile device communications data during a first day, and collecting the mobile device communications data during the current time period includes gathering the mobile device communications data during a second day. In these arrangements, the first day and the second day are a same day of the week (e.g., both are Sundays, both are Mondays, etc.).

In some arrangements, generating the first usage pattern includes collecting mobile device communications data during the prior time period, and generating the second usage pattern includes collecting mobile device communications data during the current time period. In these arrangements, the prior time period is at least twice as long as the current time period (e.g., the prior time period covers four weeks while the current time period covers one week, the prior time period covers the last four Tuesdays while the current time period is the current Tuesday, etc.).

In some arrangements, collecting the mobile device communications data during the prior time period includes (i) gathering the mobile device communications data during a particular day of the week over multiple prior weeks and (ii) averaging the gathered mobile device communications data (e.g., the average communications activity for each Sunday during the last three weeks). In these arrangements, collecting the mobile device communications data during the current time period includes gathering the mobile device communications data during the particular day of the week on a current week (e.g., Sunday of the current week). Other lengths of time are suitable for use as well.

In some arrangements, the processing circuitry resides in an authentication server. In these arrangements, providing the authentication result includes transmitting the authentication result from the authentication server to a mobile device configured to operate based on the authentication result. Accordingly, the authentication server can provide remote access control on the mobile device (e.g., lock out the user of the mobile device).

In some arrangements, the processing circuitry resides in a mobile device. In these arrangements, providing the authentication result includes transmitting the authentication result from the mobile device to an authentication server. Accordingly, the mobile device can inform the authentication server of a failed authentication event.

In some arrangements, the authentication result indicates that authentication is unsuccessful. In these arrangements, the method may further include performing a remedial operation in response to the authentication result. Examples of remedial operations include directing a mobile device to perform a step-up authentication operation in which the mobile device directly challenges a user to successfully authenticate, locking out a user from a protected resource until the user successfully authenticates, sending an alarm message to a human administrator to indicate that authentication is unsuccessful, and removing access to one or more protected resources but not other protected resources, among others.

In some arrangements, performing a remedial operation includes providing the user with a step-up authentication challenge in a follow-up attempt to authenticate the user. In these arrangements performing the remedial operation further includes, in response to unsuccessful authentication via the step-up authentication challenge, (i) locking out the user from a protected resource which is otherwise accessible via a mobile device, and (ii) outputting an alarm to warn a human administrator that authentication of the user is unsuccessful.

It should be understood that, in the cloud context, certain electronic circuitry is formed by remote computer resources distributed over a network (e.g., circuitry of an authentication server). Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing user authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to assessing mobile user authenticity based on communication activity. The results of such assessment can be used to control access to a set of protected resources. Along these lines, a current mobile device usage pattern (e.g., communications activity during a current day) can be compared with a prior mobile device usage pattern (e.g., communications activity during a previous day) to determine whether a human provider of the current usage pattern and a human provider of the prior usage pattern are the same person. Such communications activity can include phone calls, mobile texting, and other communications made from a mobile device. Accordingly, if a malicious person steals the user's mobile device or creates an impersonating mobile device to carry out malicious activities, the malicious person would fail authentication by not providing a usage pattern that is comparable to that of the authentic user. As a result, the malicious person can be denied access to the set of protected resources. Such assessment can be performed continuously in the background and thus be unobtrusive to the user.

It should be understood that assessments of mobile user authenticity based on communication activity can be performed completely locally within individual mobile devices, or involve a remote authentication server. Both situations are intended to belong to various embodiments of the invention. However, for illustration purposes and with reference to FIG. 1, an embodiment in which assessment is performed by a dedicated authentication server will now be provided.

Figure 1:
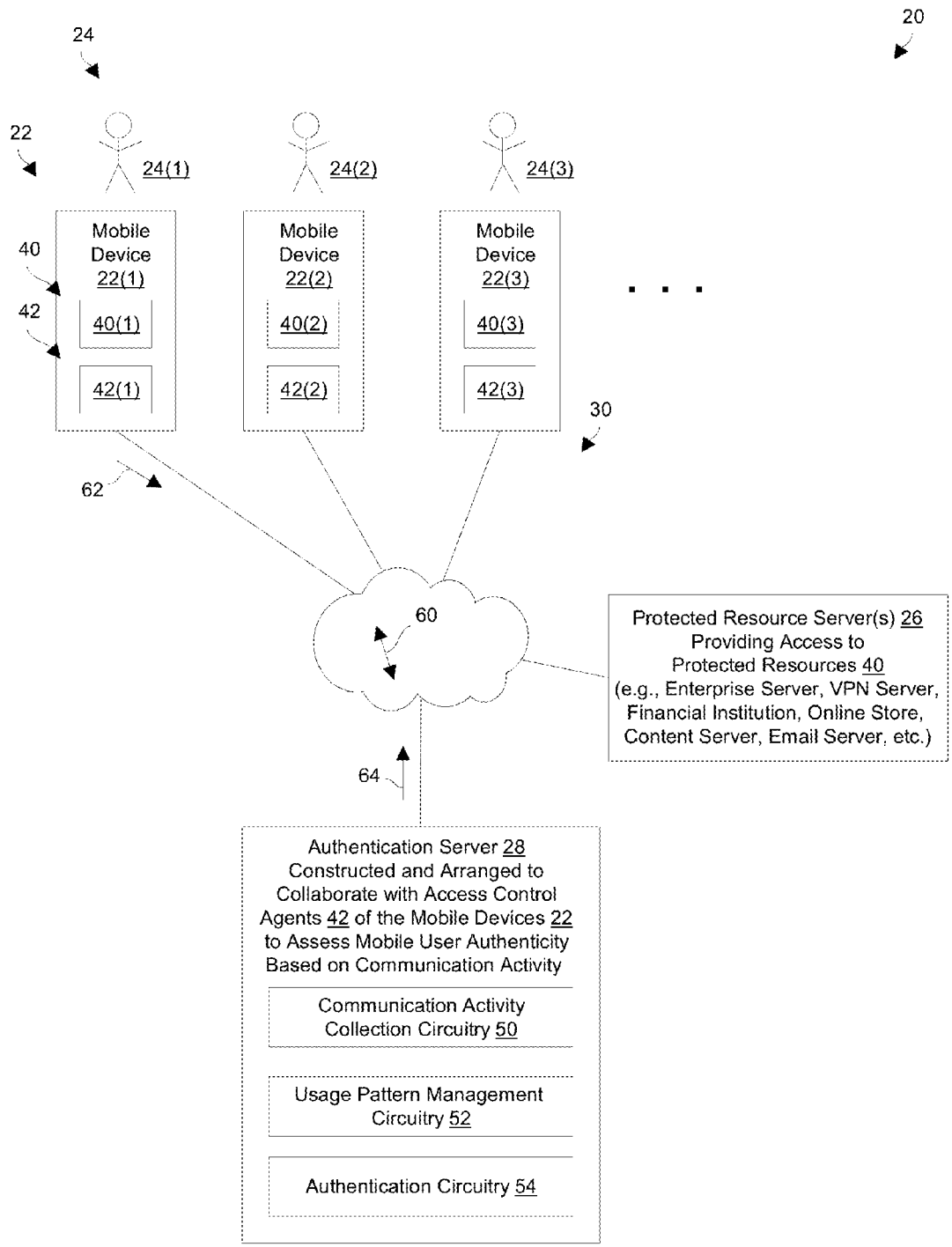
FIG. 1 is a block diagram of an electronic environment which is suitable for assessing mobile user authenticity based on communication activity.

FIG. 1 shows an electronic environment 20 which is suitable for assessing mobile user authenticity based on communication activity. The electronic environment 20 includes mobile devices 22(1), 22(2), 22(3), . . . (collectively, mobile devices 22) in possession of their respective users 24(1), 24(2), 24(3), . . . (collectively, users 24), a set of protected resource servers 26 (i.e., one or more protected resource servers 26), an authentication server 28, and a communications medium 30.

Each mobile device 22 includes a local set of resources 40 and an access control agent 42 (e.g., processing circuitry running specialized access control agent code). That is, the mobile device 22(1) includes a local set of resources 40(1) and an access control agent 42(1), the mobile device 22(2) includes a local set of resources 40(2) and an access control agent 42(2), and so on. The access control agent 42 of each mobile device 22 is constructed and arranged to provide controlled access to one or more protected resources 40 on behalf of its respective user 24. Such protected resources 40 may reside locally on the mobile device 22 (e.g., see protected resources 40(1), 40(2), 40(3), . . . ), or remotely on one or more protected resource servers 26. Examples of suitable local protected resources 40 include user interface access (i.e., unlocking the mobile devices 22), app access, contact list access, access to stored content, access to particular local features such as a camera, a phone, and so on.

The set of protected resource servers 26 maintains other protected resources 40. Such protected resources 40 are capable of being accessed remotely by the mobile devices 22. Examples of suitable remote protected resources 40 include (among others) accounts and databases of enterprises, VPNs/gateways/other networks, account access and transaction access with banks/brokerages/other financial institutions, transaction access at online stores, databases containing movies/music/files/other content, access to email, access to online games, and so on.

The authentication server 28 is equipped to perform initial or front-end authentication operations as well as secondary or back-end authentication operations. Such authentication can be used to control access to the protected resources 40. As shown in FIG. 1 and as will be described in further detail shortly, the authentication server 28 includes communication activity collection circuitry 50 to collect the communication activity data from the mobile devices 22, usage pattern management circuitry 52 to generate usage patterns based on the communication activity data, and authentication circuitry 54 to authenticate the users 24 where at least some authentication operations are base on comparisons between usage patterns.

The communications medium 30 is constructed and arranged to connect the various components of the electronic environment 20 together to enable these components to exchange electronic signals 60 (e.g., see the double arrow 60). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 24 operate their respective mobile devices 22 to perform useful work. Such work may include accessing one or more protected resources 40 (e.g., viewing a file, reading email, performing a banking transaction, etc.). Such operation may involve access to local protected resources 40 of the mobile devices 22 (e.g., access to certain apps, access to unlock the mobile devices, access to locally stored data, etc.). Alternatively or in combination, such operation may involve access to remote protected resources 40 of the external protected resource servers 26 (e.g., remote login access, remote access to content, ability to complete remote transactions, etc.). Other access control activities include installing apps, adding contacts, connecting to different networks, accessing resources, and so on. Some mobile devices 22 may be equipped with special peripherals that enable the users 24 to perform additional operations upon successful authentication such as make cellular calls, navigate using maps and GPS circuitry, take pictures, and so on.

During the course of such operation, the mobile devices 22 and the authentication server 28 collaborate to control access to the protected resources 40. Particular details of such access control will now be provided in the context of an example.

Suppose that the user 24(1) operates the mobile device 22(1) over a period of time such as several weeks. Along these lines, each time the user 24(1) starts to use the mobile device 22(1), the user 24(1) may proceed through an initial authentication process (e.g., successfully login or sign-on to the mobile device 22(1) using a PIN or passcode). Such operation may involve simple local authentication where all operations are performed via the access control agent 42(1) of the mobile device 22(1). Alternatively, such operation may involve the access control agent 42(1) taking input from the user 24(1) and communicating with the authentication server 28 to remotely authenticate the user 24(1) based on that input.

Once the user 24(1) has successfully completed front-end authentication, the user 24(1) is able to perform useful work on the mobile device 22(1) and such activity may involve accessing protected resources 40 via the mobile device 22(1). For instance, the user 24(1) may call a particular phone number for a teleconference every Monday at 10 am. Additionally, the user 24(1) may routinely call in to the office 5-6 times a day. Furthermore, the user 24(1) may frequently send text messages to personal contacts during lunchtime each day, and so on.

As the user 24(1) carries out such activity using the mobile device 22(1), the access control agent 42(1) notifies the authentication server 28 of such communications. Such conveyance of communication activity information (see arrow 62 in FIG. 1) can occur in an event driven manner (e.g., in response to each communication activity) or can be queued/buffered temporarily and conveyed periodically in an aggregated form (e.g., every 15 minutes, hourly, four times a day, etc.). As mentioned earlier, such notification can take place transparently in the background.

The communication activity collection circuitry 50 of the authentication server 28 collects the communication activity information from the mobile device 22(1) on behalf of the users 24(1), and the usage pattern management circuitry 52 generates a current usage pattern based on the communication activity information. The authentication circuitry 54 then compares the current usage pattern of the user 24(1) to a previous usage pattern of the user 24(1) to determine whether the same person is currently using the mobile device 22(1).

If the authentication circuitry 54 determines that the current and previous usage patterns match (e.g., within a predefined threshold), authentication is considered successful and the authentication server 28 informs the access control agent 42(1) and perhaps the protected resource servers 26 (see the arrow 64 in FIG. 1). That is, the user from which the current usage pattern is based is considered the same authentic user from which the previous usage pattern is based (i.e., the user is genuine). As a result, the access control agent 42(1) can continue to allow the user 24(1) to access the protected resources 40.

However, if the authentication circuitry 54 determines that the current and previous usage patterns do not match (e.g., within the predefined threshold), authentication is considered unsuccessful and the authentication server 28 informs the access control agent 42(1) and perhaps the protected resource servers 26 (again, see the arrow 64 in FIG. 1). That is, the user from which the current usage pattern is based is considered different than the user from which the previous usage pattern is based. Here, the access control agent 42(1) and/or the protected resource servers 26 are able to deny the user 24(1) further access to the protected resources 40. In some arrangements, the access control agent 42(1) and/or the protected resource servers 26 may challenge the user 24(1) with a stronger form of authentication and only remove access to the protected resources 40 if the user 24(1) cannot successfully authenticate using the stronger form of authentication.

The authentication server 28 performs similar operations on behalf of the other users 24(2), 24(3), . . . as well. Accordingly, the authentication server 28 is able to concurrently support assessment of mobile user authenticity based on communication activity for multiple users 24 and multiple mobile devices 22.

At this point, one should appreciate that different user behaviors will generate different usage patterns. For example, a user 24 that manages a team of workers may have a first usage pattern which involves routinely calling the same workers of the team throughout each business day. However, another user 24 that is in sales may routinely call different phone numbers (i.e., different potential customers) during a set time each day. Alternatively, another user 24 that works four days a week may routinely make a large number of calls on a particular day of each week (e.g., Monday) and may make relatively few calls if any but perhaps send a large number of text messages on another day of each week (e.g., Wednesday). As yet another example, another user 24 may normally sleep during the day and work late at nights or on weekends and thus have communications activity that is commensurate with such behavior.

In turn, the authentication server 28 is able to determine whether the users 24 of the mobile devices 22 are authentic based on comparing current usage patterns to previous usage patterns. In particular, if the current and previous usage patterns for a particular user 24 (e.g., the user 24(1)) do not match within a predefined tolerance, authentication of that user 24 is considered unsuccessful and the authentication server 28 performs a remedial operation. In some arrangements, the authentication server 28 sends, as the message 52, a command to lock out the user 24 from one or more of the protected resources 40 so that the user 24 must re-authenticate or re-login to regain access. In some arrangements, the authentication server 28 sends a challenge using a different form of authentication (e.g., a request for a new one-time use passcode, knowledge-based authentication, adaptive authentication, multi-factor authentication, biometric authentication, etc.). In some arrangements, the authentication server 28 sends an alarm to an administrator, and so on.

It should be understood that the time periods for the usage patterns can be chosen to minimize false positives (e.g., unsuccessful authentication of an authentic user 24). Additionally, the time periods can be chosen to provide effective identification of fraudulent activity. Further details will now be provided with reference to FIG. 2.

Figure 2:
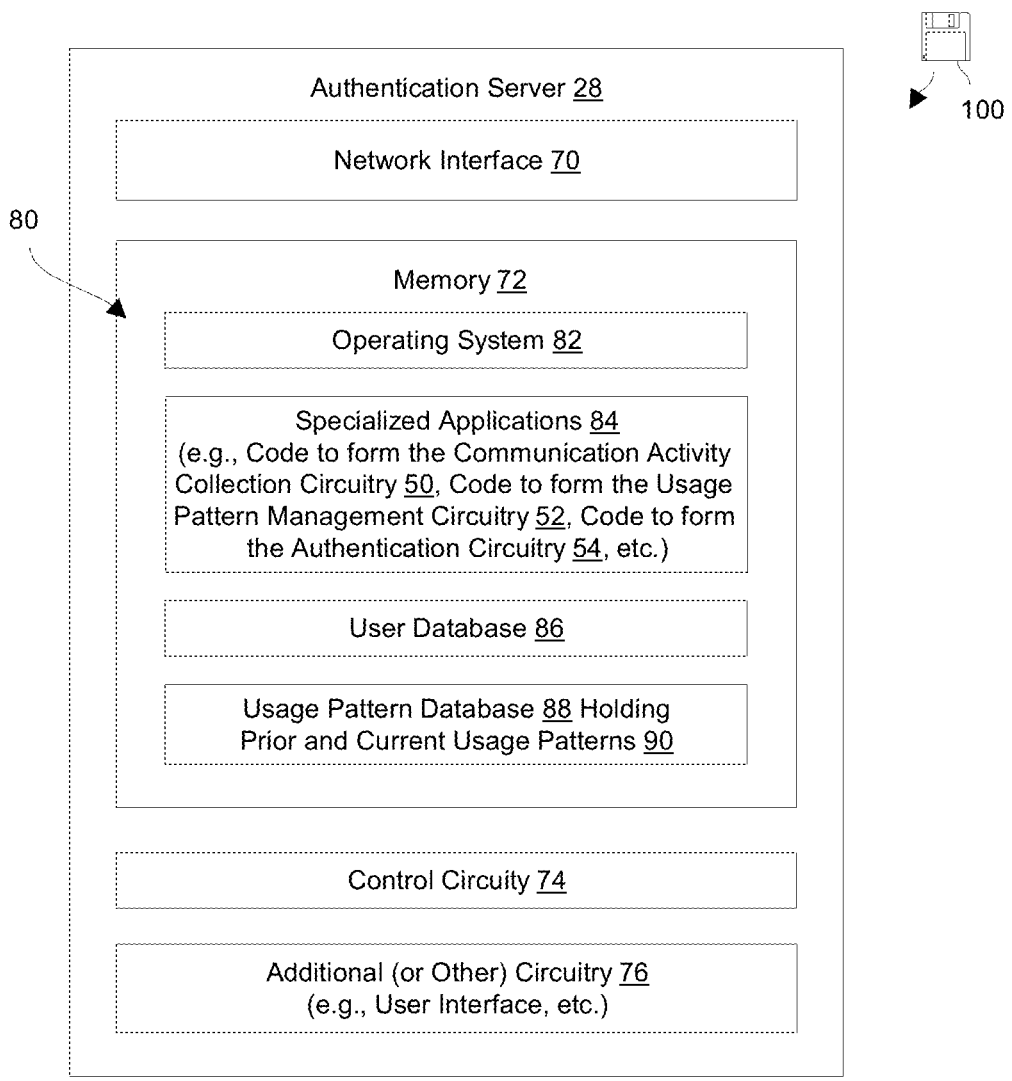
FIG. 2 is a block diagram of an electronic apparatus of the electronic environment of FIG. 1.

FIG. 2 shows particular details of the authentication server 28 of the electronic environment 20. The authentication server 28 includes a network interface 70, memory 72, control circuitry 74, and additional (or other) circuitry 76.

The network interface 70 is constructed and arranged to connect the authentication server 28 to the communications medium 30. Accordingly, the network interface 70 enables the authentication server 28 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82 to manage the computerized resources of the authentication server 28, specialized applications 84 to form the various circuitry 50, 52, 54 of the authentication server 28, a user database 86 to hold user profile information regarding the users 24, a usage pattern database 88 to hold prior and current usage patterns 90 of the users 24 for use in assessment of mobile user authenticity.

The control circuitry 74 is constructed and arranged to operate in accordance with the various software constructs 80 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 100 is capable of delivering all or portions of the software to the authentication server 28. The computer program product 100 has a non-transitory (or non-volatile) computer readable medium which stores a set of instructions which controls one or more operations of the authentication server 28. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server 28. For example, the authentication server 28 can include a user interface (i.e., a console or terminal) enabling a human administrator to set up new users 24, to deal with alarms or warning messages, to administer routine maintenance, and so on. As another example, a portion of the authentication server 28 may operate as a source for access control agent code (e.g., an app store, a central app repository, etc.) to distribute such code to mobile devices 22 during configuration/enrollment. Other components and circuitry are suitable for use as well.

During operation, the authentication server 28 runs in accordance with the specialized applications 84 to reliably and robustly control access to the protected resources 40 within the electronic environment 20. In particular, the authentication server 28 enrolls users 24 and stores the enrollment data in the user database 86. Additionally, the authentication server 28 collects communications activity information from each mobile device 22 while the users 24 perform useful work using their mobile devices 22, generates usage patterns 90 for each user 24, and assesses authenticity of each user 24 based on the usage patterns 90. Furthermore, the authentication server 28 may be involved in other forms of authentication such as front-end authentication (e.g., use of standard multi-factor authentication, adaptive authentication, knowledge-based authentication, etc.) to initially authenticate each user 24, to control access to specific resources 40 (e.g., access to resources 40 on the protected resource servers 26), for step-up authentication, and so on.

In connection with the user database 86, the user database 86 includes user profiles for the users 24 of the mobile devices 22. Each user profile includes, among other things, a user identifier to uniquely identify the user 24, a mobile device identifier to uniquely identify the user's mobile device 22, and other descriptive information. In some arrangements, the mobile device 22 is provisioned with additional security features (e.g., is configured as an authentication token, is configured as a container of security keys or other secrets that are made available in response to successful authentication, etc.), and the user database 84 stores copies of this information.

In connection with the usage pattern database 88, the usage pattern database 88 is capable of storing prior and current usage patterns 90 derived from the communication activity data received from the mobile devices 22. Recall that activity data can be gathered from the mobile devices 22 in an event driven manner and/or periodically.

In some arrangements, a prior usage pattern 90 and a current usage pattern 90 are stored in the usage pattern database 88 for each mobile device 22. Such an arrangement is capable of identifying a potentially stolen mobile device 22 or impersonating mobile device 22 when there is a significant difference in the prior and current usage patterns 90 for a particular mobile device 22.

In some arrangements, a prior usage pattern 90 and a current usage pattern 90 are stored in the usage pattern database 88 for each user 24. Such an arrangement is capable of identifying a potentially stolen mobile device 22 or impersonating user 24 when there is a significant difference in the prior and current usage patterns 90 for a particular user 24.

Other database arrangements and combinations are suitable for use as well. Further details will now be provided with reference to FIGS. 3 and 4.

Figure 3:
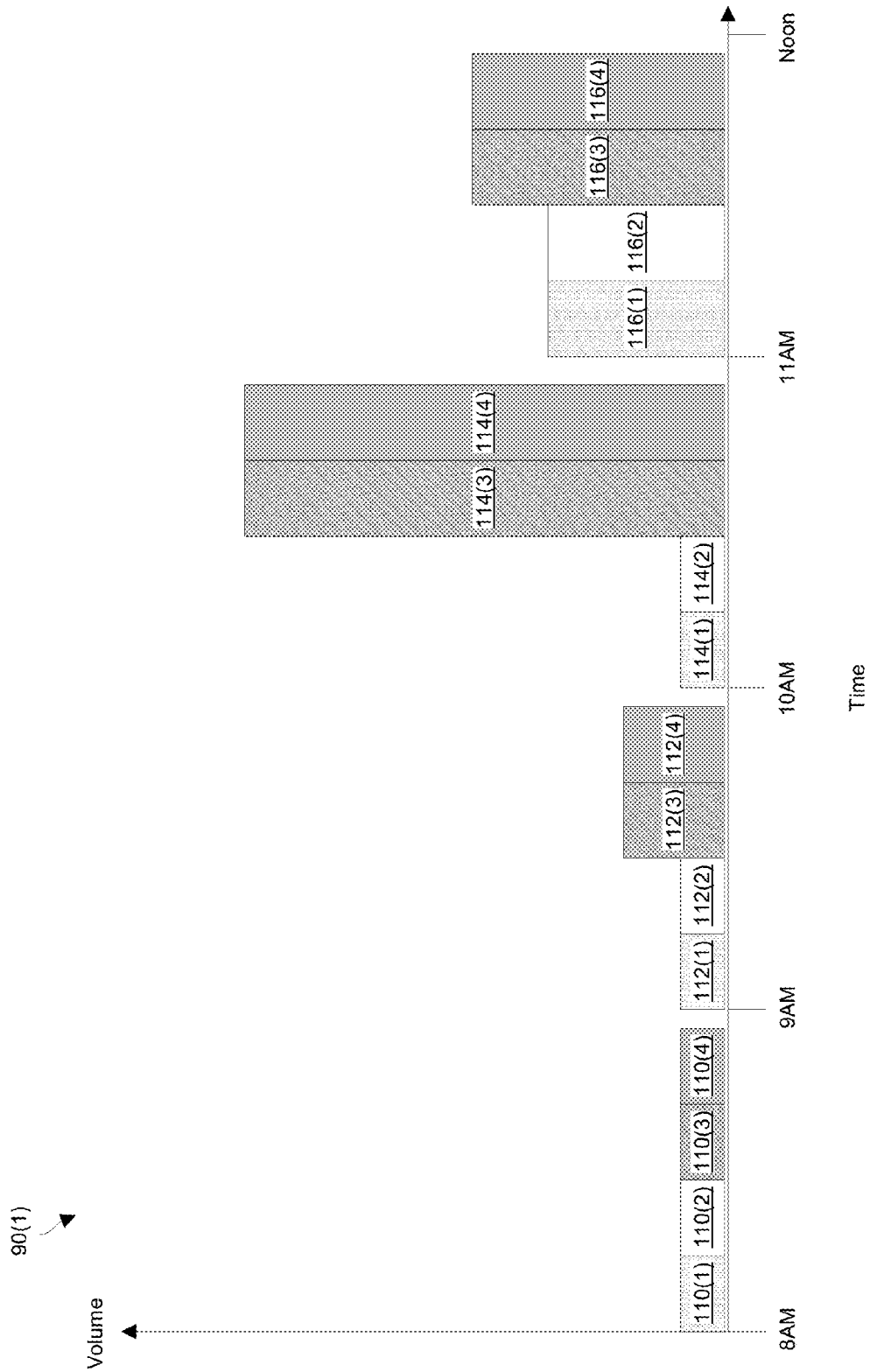
FIG. 3 is a block diagram of a first usage pattern which is generated based on communications activity from a human provider.
Figure 4:
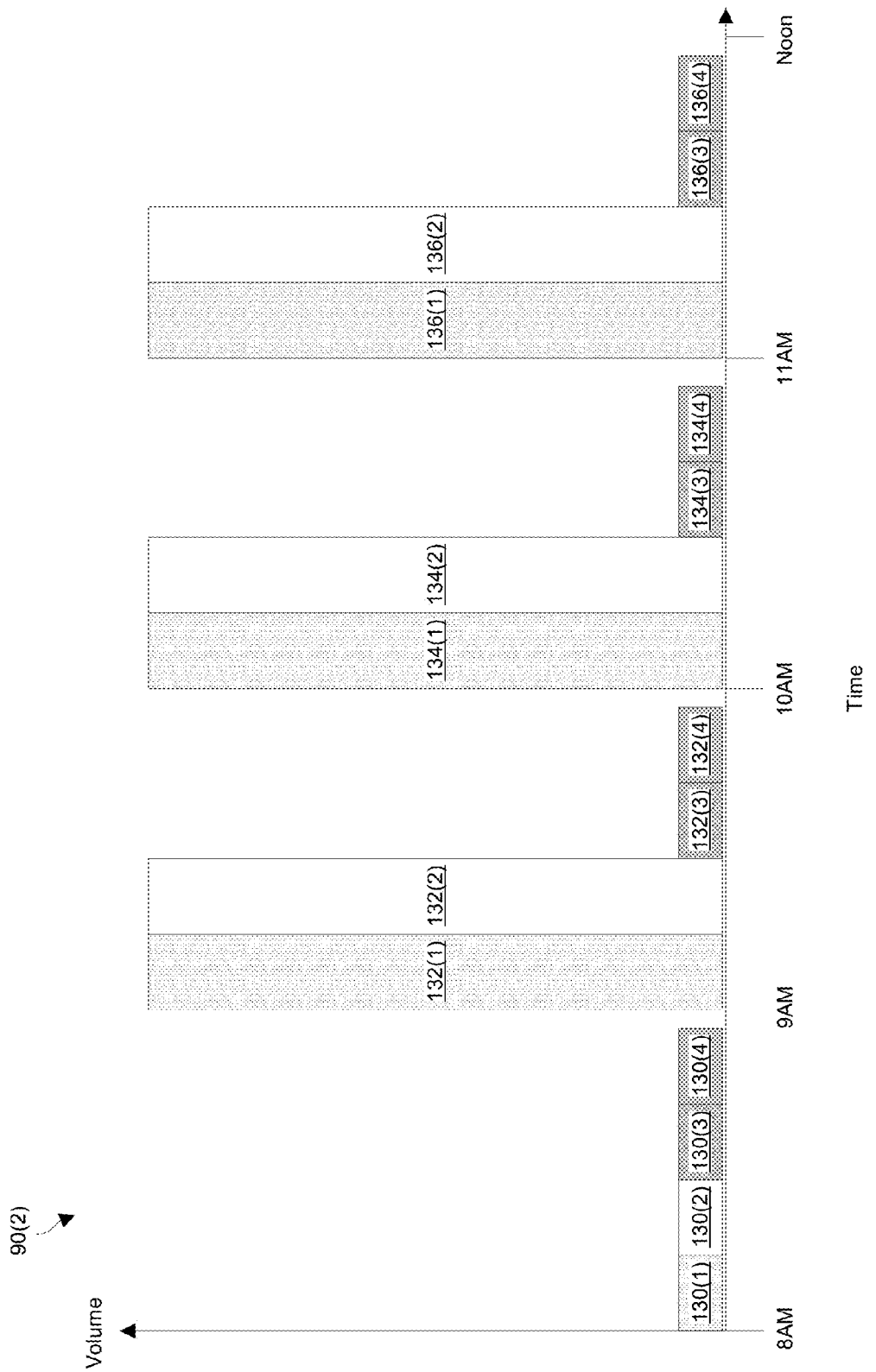
FIG. 4 is a block diagram of a second usage pattern which is generated based on communications activity from a human provider.

FIGS. 3 and 4 show example usage patterns 90(1), 90(2) (collectively, usage patterns 90) which can be generated by the authentication server 28 (also see FIGS. 1 and 2) based on particular communications activity received from the mobile devices 22. FIG. 3 shows details of a first usage pattern 90(1). FIG. 4 shows details of a second usage pattern 90(2).

Each usage pattern 90(1), 90(2) in FIGS. 3 and 4 is illustrated as a graph in which time increases along a horizontal axis (right to left), and volume (i.e., amounts of activity) increases along the vertical axis (bottom to top). Such illustration is for simplicity and by way of example only. It should be understood that the authentication server 28 may store the data for such usage patterns 90 in manner that is quite different (e.g., as data structures with well-defined parameters/fields/counters, etc.) than what is shown visually as graphs in FIGS. 3 and 4.

Each usage pattern 90 covers a predefined time period (e.g., a 15 minute interval, an hour, a four hour time window, half a day, a day, a week, etc.). The duration and particular time for the period is customizable and can be based on optimizing authentication effectiveness (e g, minimizing false positives where authentic users 24 are required to re-authenticate, effective identification of malicious activity by fraudulent users 24, a balance approach, etc.).

Such usage patterns 90 can be based on multiple days of communication data. For example, a prior usage pattern 90 can be the average volume for each Monday morning over the last four Monday mornings.

Alternatively, such usage patterns 90 can be based on a single day of communication data. For example, a current usage pattern 90 can be the exact communications volume for a current Monday morning.

By way of example, the usage patterns 90(1), 90(2) of FIGS. 3 and 4 cover a common time period of a work day morning, i.e., four hours from 8 am to noon on a Monday. In particular, the usage pattern 90(1) represents average communications activity for each Monday morning over the last four weeks (i.e., a prior usage pattern). Additionally, the usage pattern 90(2) represents precise communications activity currently for Monday of the current week (i.e., a current usage pattern).

As shown in FIGS. 3 and 4, each hour time window includes four metrics:

1. the number of non-work-related phone calls made during that hour (see metrics 110(1), 112(1), 114(1), 116(1), 130(1), 132(1), 134(1), 136(1))
2. the number of non-work-related text messages sent during that hour (see metrics 110(2), 112(2), 114(2), 116(2), 130(2), 132(2), 134(2), 136(2))
3. the number of work-related phone calls made during that hour (see metrics 110(3), 112(3), 114(3), 116(3), 130(3), 132(3), 134(3), 136(3)), and
4. the number of work-related text messages sent during that hour (see metrics 110(4), 112(4), 114(4), 116(4), 130(4), 132(4), 134(4), 136(4)).

In some arrangements, the access control agent 42 distinguishes work related and non-work related communications based on destination addresses (e.g., the phone numbers used when making the phone calls and text messages). Other time intervals, other metrics, and other numbers of metrics are suitable for use as well.

By way of example only, the prior usage pattern 90(1) shows that overall there was low communications activity between Sam and 9 am on the last four Mondays on average. Additionally, the average number of non-work-related phone calls made between 9 am and 10 am (metric 112(1)) and the average number of non-work-related text messages sent between 9 am and 10 am (metric 112(2)) stayed low, while the average number of work-related phone calls made between 9 am and 10 am (metric 112(3)) and the average number of work-related text messages sent between 9 am and 10 am (metric 112(4)) slightly increased. Furthermore, the average number of non-work-related phone calls made between 10 am and 11 am (metric 114(1)) and the average number of non-work-related text messages sent between 10 am and 11 am (metric 114(2)) stayed low, while the average number of work-related phone calls made between 10 am and 11 am (metric 114(3)) and the average number of work-related text messages sent between 10 am and 11 am (metric 114(4)) were at significant levels, and so on.

If a current user 24 is the same person as the user 24 that provided the usage pattern 90(1) (FIG. 3), similar behavior is expected. However, suppose that the usage pattern 90(2) of FIG. 4 is generated from communications activity from a user 24 of the same mobile device 22 (or alternatively a user 24 indicating that he/she is the same person by using the same username/ID but different mobile devices 22). Between Sam and 9 am, the communications activity of the current usage pattern (i.e., usage pattern 90(2)) matches the communications activity of the prior usage pattern (i.e., usage pattern 90(1) in FIG. 3). In contrast, between 9 am and 10 am, the current usage pattern 90(2) does not match the prior usage pattern 90(1) (see FIG. 4). Rather, the number of non-work-related phone calls made and the number of non-work-related text messages sent during this hour in the current usage pattern 90(2) is significantly higher than that of the prior usage pattern 90(1).

As mentioned earlier, the authentication circuitry 54 of the authentication server 28 can be configured to compare usage patterns 90 at different time intervals (e.g., at 15 minute intervals, at one hour intervals, at four hour intervals, etc.). Such operation can be directed via control parameters which are set by a human administrator, by initial default parameters, etc.

If the authentication circuitry 54 is directed to compare usage patterns 90 at one hour intervals, by way of example, the authentication circuitry 54 may find that the difference between the usage patterns 90 for the interval between the Sam-9 am does not exceed the predefined threshold. In such a situation, the authentication server 28 considers the users 24 to be the same person and continues to grant access.

On the other hand, if the usage pattern differences do exceed the predetermined threshold, the authentication circuitry 54 performs a remedial operation. For example, suppose that the difference between the usage patterns 90 for the interval between the 9 am-10 am does exceed the predefined threshold. In particular, there is a significant increase in the volume of non-work related call and text messages (e.g., based on tracking destination phone/texting numbers). When the authentication circuitry 54 determines that the usage pattern difference exceeds the predefined threshold, the authentication circuitry 54 takes remedial action (e.g., requests the user 24 to authenticate using a stronger form of authentication to confirm that the user is authentic, etc.). Accordingly, in response to detection that the usage patterns 90 are inconsistent, the authentication circuitry 54 imposes stronger security.

As shown in FIGS. 3 and 4, there are different patterns in communication activity during the time intervals between 10 am-11 am and between 11 am-noon. Accordingly, it is possible that the authentication circuitry 54 will compare the usage pattern differences for these intervals to the predefined threshold and again conclude that the differences exceed the predefined threshold. As a result, the authentication circuitry 54 will perform a remedial operation (e.g., the same remedial operation, a higher security remedial operation, etc.) in each of these intervals to impose security over the protected resources 40.

On the other hand, if the usage pattern differences do not exceed the predetermined threshold, the authentication server 28 considers the users 24 to be the same person and continues to grant access. However, if the difference exceeds the predetermined threshold, the authentication server 28 considers the users 24 to be different people and performs a remedial operation such as prompting the current user 24 to authenticate using a stronger form of authentication.

Likewise, the other subsequent time windows (i.e., the span from 10 am to 11 am in FIGS. 3 and 4, and the span from 11 am to noon in FIGS. 3 and 4) show different behaviors. Such usage pattern differences, if they exceed the predetermined threshold, would result in remedial operation by the authentication server 28.

It should be understood that a variety of techniques can be applied to compute the difference between usage patterns 90. In some arrangements, the volume difference in each category (e.g., non-work phone calls, work phone calls, non-work text messaging, work text messaging, etc.) is mathematically summed and compared to the predefined threshold. In another arrangement, the volume differences between categories are weighted differently (e.g., calls being weighted more heavily than text messages, activity during normal business hours weighted more heavily than activity during off hours, etc.). In other arrangements, the categories are different (e.g., sales calls vs. existing customer calls vs. office calls vs. personal calls, etc.). In other arrangements, various totals or subtotals are normalized prior to comparison, and so on.

It should be further understood that the collection of communication activity data, generation and comparison of usage patterns 90 based on that communication activity was described above as being performed by the authentication server 28. In other embodiments, such processing is performed locally by each mobile device 22 to impose access control.

Moreover, the time intervals for the usage patterns can be longer or shorter than one-hour in the example above. For instance, the interval can be over two hour (e.g., a sliding window applied to the communication activity of FIGS. 3 and 4). As another example, the interval can be over four hours (e.g., the whole amount of communications activity shown in FIGS. 3 and 4), and so on. Further details will now be provided with reference to FIG. 5.

Figure 5:
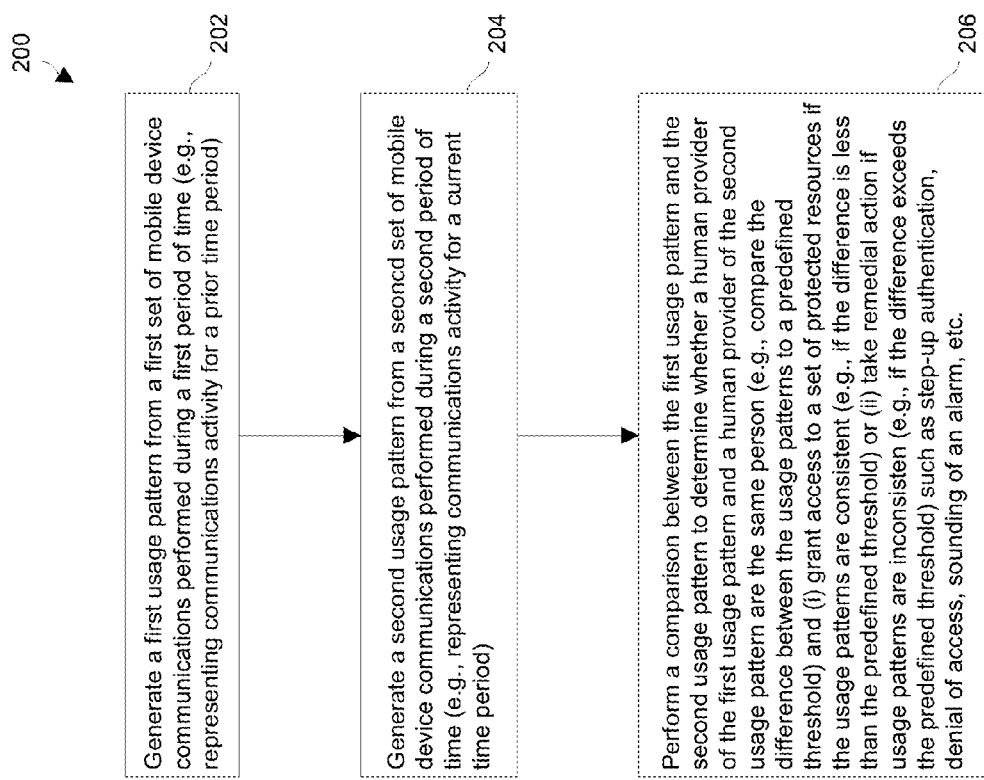
FIG. 5 is a flowchart of a procedure which is performed by the electronic apparatus of FIG. 2.

FIG. 5 is a flowchart of a procedure 200 for performing user authentication which is performed by an electronic apparatus such as a mobile device 22 or an authentication server 28. At 202, the electronic apparatus generates a first usage pattern 90 from a first set of mobile device communications performed during a first period of time. For example, the first usage pattern 90 can represent prior communications activity for a prior time period, or average communications activity for a prior time period (also see FIG. 3).

At 204, the electronic apparatus generates a second usage pattern 90 from a second set of mobile device communications performed during a second period of time. For example, the second usage pattern 90 can represent current communications activity for a current time period (also see FIG. 4).

At 206, the electronic apparatus performs a comparison between the first usage pattern 90 and the second usage pattern 90 to determine whether a human provider of the first usage pattern 90 and a human provider of the second usage pattern 90 are the same person. In some arrangements, the electronic apparatus derives a numerical score based on the comparison between the first and second usage patterns 90, the numerical score indicating how closely the current mobile device communication activity during the current time period matches the prior mobile device communication activity during the prior time period. The electronic apparatus then compares the numerical score (or a normalized numerical score) to a predefined threshold and outputs, as an authentication result, a value indicating whether the numerical score is lower or higher than the predefined threshold, i.e., whether the usage patterns 90 are consistent.

If the numerical score is lower than the predefined threshold, the authentication result indicates successful user authentication and the user 24 is allowed to continue accessing the protected resources 40 (also see FIG. 1). However, if the numerical score is higher than the predefined threshold, the authentication result indicates unsuccessful user authentication and the user 24 and a remedial operation is performed (e.g., performing step-up authentication, notifying an administrator, combinations thereof, etc.).

It should be understood that, when the assessment is performed remotely by an authentication server 28, the authentication server 28 can send a signal back to the mobile device 22 as well as to one or more protected resource servers 26. Such operation enables the authentication server 28 to control access based on the assessment (e.g., continue to grant access to protected resources, deny access, perform re-authentication, etc.).

Additionally, when the assessment is performed locally by the mobile device 22, the mobile device 22 can send a signal to the authentication server 28. In turn, the authentication server 28 may, based on a set of policies, send a signal back to the mobile device 22 as well as to one or more protected resource servers 26 in order to impose access control. Accordingly, the authentication server 28 is able to control access based on the assessment (e.g., continue to grant access to protected resources, deny access, perform re-authentication, etc.).

As described above, improved techniques are directed to assessing mobile user authenticity based on communication activity. In particular, a current usage pattern 90 (e.g., communications activity during a current day) can be compared with a prior usage pattern 90 (e.g., communications activity during a previous day) to determine whether a human provider of the current usage pattern 90 and a human provider of the prior usage pattern 90 are the same person. Such communications activity may include phone calls, mobile texting, and the like. Accordingly, if a malicious person steals the user's smart phone or creates an impersonating smart phone for malicious purposes, the malicious person would fail the assessment by not providing a comparable usage pattern as the authentic user. For example, since it is unlikely that the malicious person can provide the same phone call behavior or the same text messaging behavior, the malicious person will be identified as unauthentic and denied access. Such assessment can be performed continuously in the background as a transparent operation to the user.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as one or more of the servers 26, 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the communications activity described above was initiated by the mobile devices 22. Such improved techniques may factor in other communications activity as well such as communications which are initiated by other devices (e.g., calls made to the mobile devices 22, text messages received by the mobile devices 22, etc.).

Furthermore, it should be understood that the way or manner in which the access control agents 42 count communications activity can be modified or updated over time (e.g., by changing policies/rules/filtering mechanisms, etc.). In particular, the access control agents 42 can be configured to take into account who the user communicates with (e.g., track which different phone numbers the user communicates with and revise over time), by which means (e.g., by which devices 22), by frequency, the length of activity collection time frames, and so on. Accordingly, effectiveness of discovering fraudulent activity and minimizing false positives can be advanced over time in this manner.

Moreover, it should be understood that the above-described mobile devices 22 were described above in some arrangements as smart phones. It should be understood that the mobile devices 22 may be types of other than smart phones (e.g., tablet devices, personal assistant devices, laptops, etc.). Moreover, communications activity may include phone calls, text messages, emails, downloads, and various other types of external communications. Such modifications and enhancements are intended to belong to various embodiments of the disclosure.

What is claimed is:

1. A method of performing user authentication, the method comprising:
   generating, by processing circuitry, a first usage pattern from a first set of mobile device communications performed during a first period of time;
   generating, by the processing circuitry, a second usage pattern from a second set of mobile device communications performed during a second period of time; and
   performing, by the processing circuitry, a comparison between the first usage pattern and the second usage pattern to determine whether a human provider of the first usage pattern and a human provider of the second usage pattern are the same person;
   wherein the first usage pattern identifies prior mobile device communication activity during a prior time period;
   wherein the second usage pattern identifies current mobile device communication activity during a current time period;
   wherein performing the comparison between the first and second usage patterns includes providing an authentication result indicating whether the current mobile device communication activity during the current time period matches the prior mobile device communication activity during the prior time period;
   wherein generating the first usage pattern includes collecting mobile device communications data during the prior time period;
   wherein generating the second usage pattern includes collecting mobile device communications data during the current time period; and
   wherein the prior time period is at least twice as long as the current time period.

2. A method as in claim 1 wherein providing the authentication result includes:
   deriving a numerical score based on the comparison between the first and second usage patterns, the numerical score indicating how closely the current mobile device communication activity during the current time period matches the prior mobile device communication activity during the prior time period.

3. A method as in claim 2 wherein providing the authentication result further includes:
   outputting, as the authentication result, (i) a successful authentication value indicating successful user authentication when the numerical score is below a predefined threshold and (ii) an unsuccessful authentication value indicating unsuccessful user authentication when the numerical score is above the predefined threshold.

4. A method as in claim 1 wherein collecting the mobile device communications data during the prior time period includes gathering the mobile device communications data during a first day;
   wherein collecting the mobile device communications data during the current time period includes gathering the mobile device communications data during a second day; and
   wherein the first day and the second day are a same day of the week.

5. A method as in claim 1 wherein collecting the mobile device communications data during the prior time period includes (i) gathering the mobile device communications data during a particular day of the week over multiple prior weeks and (ii) averaging the gathered mobile device communications data; and wherein collecting the mobile device communications data during the current time period includes gathering the mobile device communications data during the particular day of the week on a current week.

6. A method as in claim 1 wherein the processing circuitry resides in an authentication server; and wherein providing the authentication result includes:
transmitting the authentication result from the authentication server to a mobile device configured to operate based on the authentication result.

7. A method as in claim 1 wherein the processing circuitry resides in a mobile device; and wherein providing the authentication result includes:
transmitting the authentication result from the mobile device to an authentication server.

8. A method as in claim 1 wherein the authentication result indicates that authentication is unsuccessful; and wherein the method further comprises:
performing a remedial operation in response to the authentication result.

9. A method as in claim 8 wherein performing the remedial operation in response to the authentication result includes:
directing a mobile device to perform a step-up authentication operation in which the mobile device directly challenges a user to successfully authenticate.

10. A method as in claim 8 wherein performing the remedial operation in response to the authentication result includes:
locking out a user from a protected resource until the user successfully authenticates.

11. A method as in claim 8 wherein performing the remedial operation in response to the authentication result includes:
sending an alarm message to a human administrator to indicate that authentication is unsuccessful.

12. A method as in claim 1 wherein the human provider of the first usage pattern obtained access to a protected resource during the first period of time;
wherein the second period of time occurs after the first period of time;
wherein the authentication result indicates that the human provider of the first usage pattern and the human provider of the second usage pattern are not the same person; and
wherein the method further comprises:
in response to the result of the comparison indicating that the human provider of the first usage pattern and the human provider of the second usage pattern are not the same person, denying the human provider of the second usage pattern access to the protected resource.

13. A method as in claim 12 wherein performing the comparison between the first usage pattern and the second usage pattern forms a first user authentication operation; and wherein the method further comprises:
in response to denying the human provider of the second usage pattern access to the protected resource, providing the human provider of the second usage pattern with an authentication challenge which provides a stronger form of user authentication than that provided by performing the comparison between the first usage pattern and the second usage pattern in an attempt to authenticate the human provider of the second usage pattern in a second authentication operation.

14. An electronic apparatus, comprising:
memory; and
control circuitry coupled to the memory, the memory storing instructions which, when carried out by the control circuitry, cause the control circuitry to:
generate a first usage pattern from a first set of mobile device communications performed during a first period of time,
generate a second usage pattern from a second set of mobile device communications performed during a second period of time, and perform a comparison between the first usage pattern and the second usage pattern to determine whether a human provider of the first usage pattern and a human provider of the second usage pattern are the same person;
wherein the first usage pattern identifies prior mobile device communication activity during a prior time period;
wherein the second usage pattern identifies current mobile device communication activity during a current time period;
wherein the control circuitry, when performing the comparison between the first and second usage patterns, is constructed and arranged to provide an authentication result indicating whether the current mobile device communication activity during the current time period matches the prior mobile device communication activity during the prior time period;
wherein the control circuitry, when generating the first usage pattern, is constructed and arranged to collect mobile device communications data during the prior time period;
wherein the control circuitry, when generating the second usage pattern, is constructed and arranged to collect mobile device communications data during the current time period; and
wherein the prior time period is at least twice as long as the current time period.

15. An electronic apparatus as in claim 14 wherein the control circuitry, when providing the authentication result, is constructed and arranged to:
derive a numerical score based on the comparison between the first and second usage patterns, the numerical score indicating how closely the current mobile device communication activity during the current time period matches the prior mobile device communication activity during the prior time period; and
output, as the authentication result, (i) a successful authentication value indicating successful user authentication when the numerical score is below a predefined threshold and (ii) an unsuccessful authentication value indicating unsuccessful user authentication when the numerical score is above the predefined threshold.

16. An electronic apparatus as in claim 15
wherein the control circuitry, when collecting the mobile device communications data during the prior time period, is constructed and arranged to (i) gather the mobile device communications data during a particular day of the week over multiple prior weeks and (ii) average the gathered mobile device communications data; and
wherein the control circuitry, when collecting the mobile device communications data during the current time period, is constructed and arranged to gather the mobile device communications data during the particular day of the week on a current week.

17. An electronic apparatus as in claim 16 wherein the control circuitry is further constructed and arranged to perform a remedial operation by:

providing the user with a step-up authentication challenge in a follow-up attempt to authenticate the user, and in response to unsuccessful authentication via the step-up authentication challenge, (i) lock out the user from a protected resource which is otherwise accessible via a mobile device, and (ii) output an alarm to warn a human administrator that authentication of the user is unsuccessful.

18. A computer program product having a non-transitory computer readable medium which stores a set of instructions to perform user authentication, the set of instructions, when carried out by computerized circuitry, causing the computerized circuitry to perform a method of:

generating a first usage pattern from a first set of mobile device communications performed during a first period of time;

generating a second usage pattern from a second set of mobile device communications performed during a second period of time; and performing a comparison between the first usage pattern and the second usage pattern to determine whether a human provider of the first usage pattern and a human provider of the second usage pattern are the same person;

wherein the first usage pattern identifies prior mobile device communication activity during a prior time period;

wherein the second usage pattern identifies current mobile device communication activity during a current time period;

wherein performing the comparison between the first and second usage patterns includes providing an authentication result indicating whether the current mobile device communication activity during the current time period matches the prior mobile device communication activity during the prior time period;

wherein generating the first usage pattern includes collecting mobile device communications data during the prior time period;

wherein generating the second usage pattern includes collecting mobile device communications data during the current time period; and wherein the prior time period is at least twice as long as the current time period.

* * * * *